June 16, 1936.  G. F. GERDTS  2,044,162
CONNECTED VALVE
Filed April 15, 1935  2 Sheets-Sheet 1

Inventor:
Gustav F. Gerdts
by
Alfred T. Olsen
Attorney

June 16, 1936.　　　G. F. GERDTS　　　2,044,162
CONNECTED VALVE
Filed April 15, 1935　　　2 Sheets-Sheet 2

Inventor:
Gustav F. Gerdts
by
Attorney

Patented June 16, 1936

2,044,162

UNITED STATES PATENT OFFICE 2,044,162

CONNECTED VALVE

Gustav Friedrich Gerdts, Bremen, Germany

Application April 15, 1935, Serial No. 16,359
In Germany April 23, 1934

2 Claims. (Cl. 277—31)

The invention relates to a valve with two closing members for admitting a liquid or gaseous working medium under pressure to a device for actuating and operating, for instance a blow-off valve and after such operation discharge, blow-out or exhaust the spent part of the working medium then in the pipe line between the valve and the operated device without pressure.

The use of slides in valves of this description is rarely satisfactory, mostly through not producing a seal tight enough to be relied upon under all circumstances, whilst cocks are mostly hard to turn and inconvenient to handle.

The object of my invention is to provide within a casing a cone valve and a revoluble slide, the two closing members arranged so as to be adapted to come into action one after the other, to the desired extent, through being yieldably coupled to a suitable degree and so that the function of each closing member is independent from that of the other, thereby securing comparatively broader contacting surfaces and a doubly reliable closure or seal.

In describing my improvements reference is made to the accompanying drawings in which Fig. 1 is a section on line A—A of Fig. 2, partly in elevation.

Figure 1:
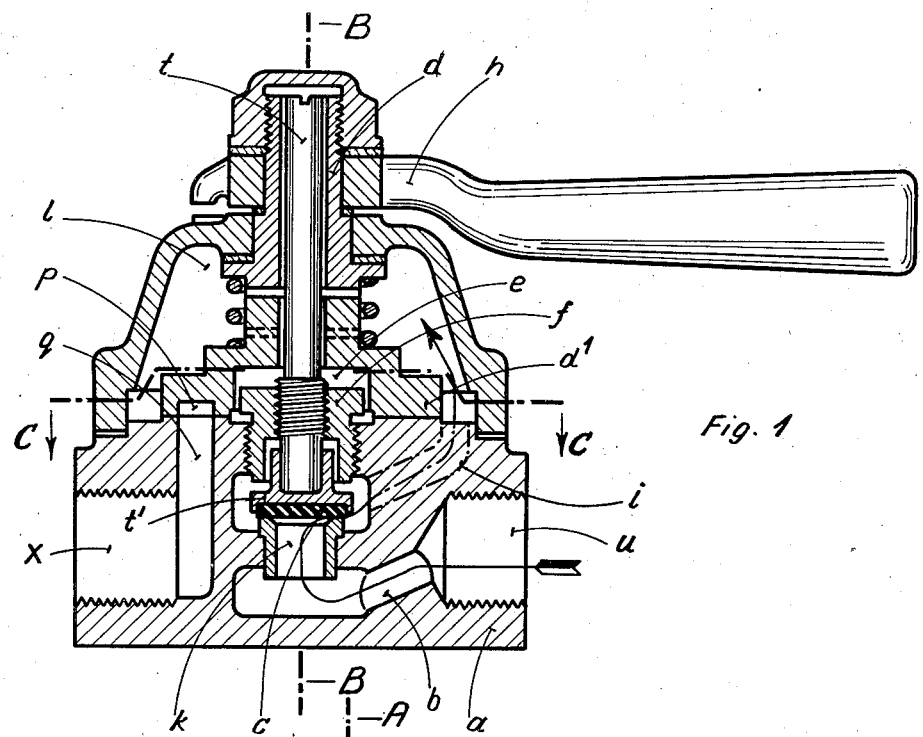
Figure 2:
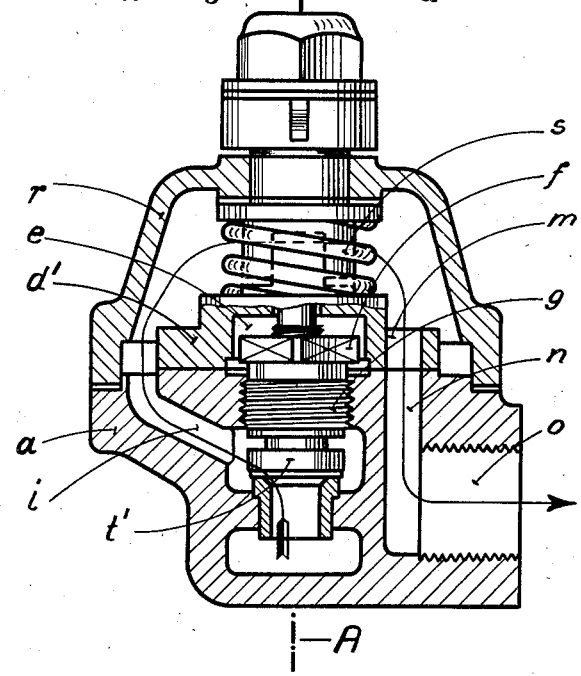
Fig. 2 is a section on line B—B of Fig. 1, partly in elevation and broken off.
Figure 3:
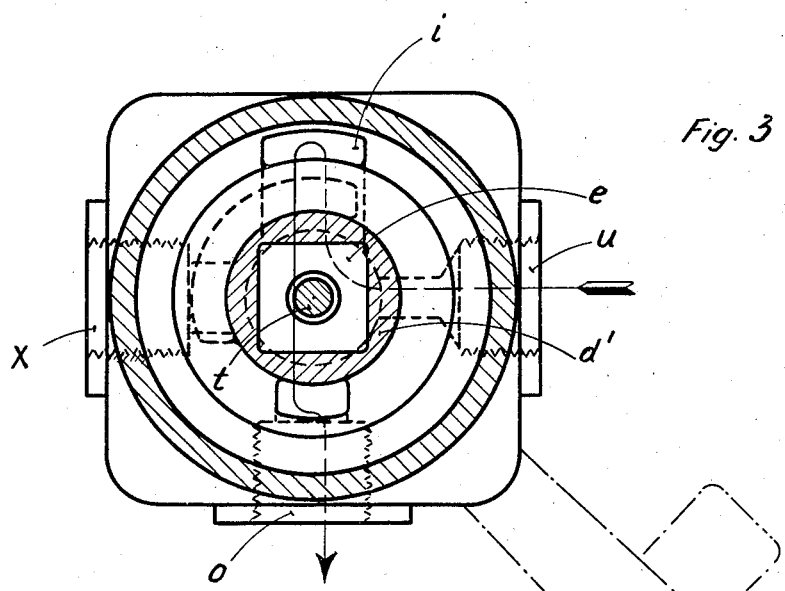
Fig. 3 is a section on line C—C of Fig. 1, partly in elevation.
Figure 4:
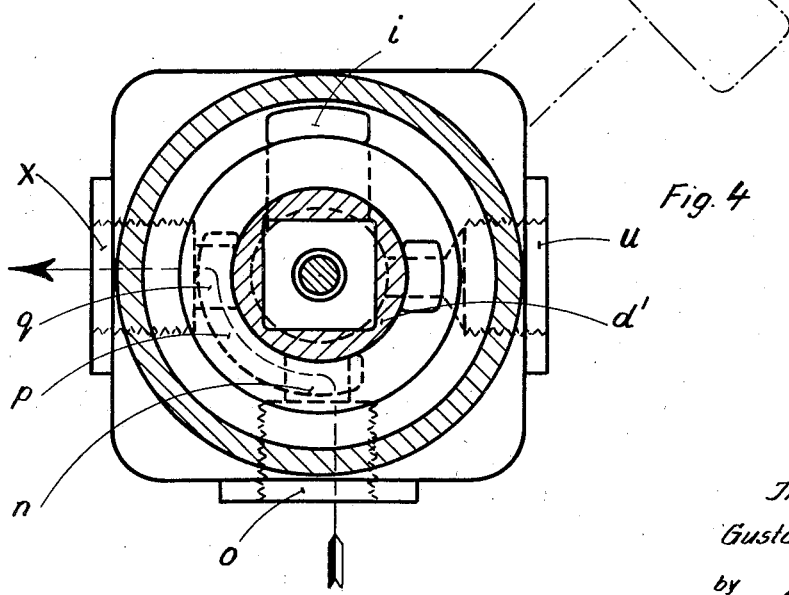
Fig. 4 is a section on line C—C of Fig. 1, partly in elevation, the valve bodies shown in positions different from those in Fig. 3.

Referring now to the drawings, casing $a$ is provided within with a flat surface on which rests the revoluble slide, the spindle of which consists of the upper part $d$ to which handle $b$ is secured, and the lower part $d'$ with the contacting surface.

Passages or channels, as $p$, $q$, $m$ and $n$ in the contacting parts of the casing and the lowest part of the slide serve to alternately connect or disconnect the inlet- and outlet openings $u$, $o$ and $x$ of the valve casing.

The lower part $d'$ of the spindle of the slide forms a square recess $e$ to movably receive the square-sectioned head $f$ of the spindle of the cone valve which is adapted to limitedly screw into and out of the casing for seating and unseating, respectively. The seating cone of the valve is secured to part $t'$ which is tightly secured to or screwed into square head $f$, whilst part $t$ extends centrally upwardly through the hollow slide spindle for the purpose of allowing to suitably adjust, one towards the other, the seats of cone valve and slide whenever this should become advisable through wear.

Parts $d$ and $d'$ of the slide spindle are axially yieldably coupled, by any suitable means, a spring, as $s$, serving to press part $d'$ onto the contacting surface of the casing.

Operating the valve by turning handle $h$, the hollow slide spindle is turned and with it the cone spindle, the square head $f$ of which is movably held in square recess $e$ in the slide, and as head $f$ is thereby at the same time screwed in the direction out of the casing, the working medium under pressure then passes into space $l$ through passage $b$, around cone seat $c$ and passage $i$, holding the revoluble slide $d'$ to its seat. On further turning the handle, the working medium is passed on to one, two or more actuating devices through a correspondingly large number of outlets (not shown). Returning handle $h$ to its position of rest, space $l$ is then again in communication with the outer air.

To counteract any changes in the angularity of the handle due to wear, valve spindle $t$ is turned correspondingly in the interiorly screw-threaded square head $f$, for instance by means of a screwdriver.

In this manner the position of the cone valve can at any time during operation be corrected if required so as to be always in agreement with the relative position of the slide. Turning the handle all operations are effected automatically, as desired, without a possibility of failure.

The two parts $d$ and $d'$ of the slide spindle are kept separated longitudinally by spring $s$. Should the pressure of this spring plus the pressure of the working medium be so great as to cause undesirable friction, or should there be a negative pressure within the casing, the arrangement can be changed so that part or all of the pressure is exerted to maintain contact between the sealing surfaces without undesirable friction. Parts $d$ and $d'$ can be coupled suitably by any of the means known for this purpose to allow the revoluble slide to move freely axially.

Through this valve any number of devices can be supplied with working medium under pressure and then the spent working medium discharged or exhausted through outlets provided therefor.

Having thus described my invention, what I claim is:—

1. A valve for pressure-actuated devices, comprising within a casing, two closing members, a flat revoluble slide and a screw-moved reciprocating valve yieldably connected so that the spindle of the reciprocating valve passes centrally through the spindle of the revoluble slide and so that a non-circular part of the valve spindle is engaged by a corresponding recess in the slide spindle, whereby turning of the slide spindle causes also turning of the valve spindle, both spindles moving axially each independent from the other.

2. A valve for pressure-actuated devices, comprising within a casing, two closing members, a flat revoluble slide and a co-axial reciprocating valve, a hollow slide spindle, a valve spindle extending centrally upwardly through the slide spindle, an outwardly screw-threaded part with square head movably supporting the valve spindle for screwing limitedly out of or in to the casing to control the valve opening when the square head is turned by the slide spindle and a yieldable screw connection between the square head and the valve spindle for raising or lowering the reciprocating valve relative to the contacting surfaces of slide and casing by means of adjustably turning the valve spindle from without.

GUSTAV FRIEDRICH GERDTS.